United States Patent [19]
Terrasson

[11] Patent Number: 6,091,421
[45] Date of Patent: Jul. 18, 2000

[54] DISPLAYING AUTOSTEREOGRAMS OF VARIOUS DEPTHS UNTIL PROPER 3D PERCEPTION IS ACHIEVED

[75] Inventor: Jean-Francois Terrasson, Le Mans, France

[73] Assignee: U.S. Philips Corporation, New York, N.Y.

[21] Appl. No.: 08/990,929

[22] Filed: Dec. 15, 1997

[30] Foreign Application Priority Data

Dec. 19, 1996 [EP] European Pat. Off. ............. 96402829

[51] Int. Cl.$^7$ .................................................. G06T 17/00
[52] U.S. Cl. ........................................................ 345/419
[58] Field of Search .................................. 345/419, 151, 345/7–9, 422, 424, 428; 359/22–25

[56] References Cited

U.S. PATENT DOCUMENTS

| | | | |
|---|---|---|---|
| 5,337,096 | 8/1994 | Qu et al. | 353/7 |
| 5,357,293 | 10/1994 | Uomori et al. | 351/209 |
| 5,495,576 | 2/1996 | Ritchey | 345/425 |
| 5,644,324 | 7/1997 | Maguire, Jr. | 345/9 |
| 5,760,933 | 6/1998 | Aritake et al. | 359/22 |
| 5,801,760 | 9/1998 | Uomori | 348/47 |

FOREIGN PATENT DOCUMENTS 9530968  11/1995  WIPO .............. G06T 15/00

*Primary Examiner*—Mark K. Zimmerman
*Assistant Examiner*—Albert K. Lee
*Attorney, Agent, or Firm*—Jack D. Slobod

[57] ABSTRACT

A series of autostereograms of a three dimensional scene is displayed. The apparent depth of a reference surface in the scene is varied from one autostereogram of the series to another. A human viewer looks at the autostereograms, adjusting the eyes to viewing of a surface at an arbitrary depth. When the apparent depth of the surface corresponds to the arbitrary depth, the human viewer will perceive a three dimensional effect and signal this with a feedback signal. Upon detection of the feedback signal a further autostereogram is displayed instead of the series of autostereograms. The further autostereogram displays of a further three dimensional scene containing a further reference surface, in which a further apparent depth of the further reference surface is selected according to the apparent depth for which the viewer feedback was received. Thus the further apparent depth is adjusted to the setting of the eyes of the human viewer. In an embodiment, the position of the eyes of the human viewer is monitored and the further autostereogram is adapted as the viewer moves his or her eyes to keep the depth perception constant. In another embodiment the depth perception is enhanced by supplying a stereophonic sound simulating a sound source related to the scene.

9 Claims, 3 Drawing Sheets

DISPLAYING AUTOSTEREOGRAMS OF VARIOUS DEPTHS UNTIL PROPER 3D PERCEPTION IS ACHIEVED

BACKGROUND OF THE INVENTION

The invention relates to a method and device for displaying an autostereogram.

It is known to image a three dimensional scene by means of an autostereogram. This is described for example in PCT patent application WO 95/30968. An autostereogram is a two dimensional image in which a basic image pattern is periodically repeated along lines in a display plane which run parallel to an imaginary line connecting the intended positions of the eyes of a human viewer. In the autostereogram the spatial period of repetition is modulated dependent on variations in depth of surfaces from the scene both as a function of location along said lines running parallel to the imaginary lines and transverse to said direction.

To perceive depth from the autostereogram, the human viewer must make the lines of sight from his or her eyes to the autostereogram converge in a convergence plane different from the display plane in which the autostereogram is displayed. The distance between this convergence plane and the eyes of the human viewer corresponds to the distance at which an object of the three dimensional scene, for example a background, must be perceived. No three dimensional effect will perceived until the human viewer achieves convergence to the proper convergence plane associated with the autostereogram being viewed. This makes it difficult to perceive the three dimensional scene.

OBJECTS AND SUMMARY OF THE INVENTION

It is an object of the invention to provide for a device and method that makes it easier for the human viewer to perceive the three dimensional scene.

The invention provides for a method for displaying autostereograms, the method comprising the steps of
successively displaying a series of autostereograms of a three dimensional scene containing a reference surface, an apparent depth at which the reference surface is rendered varying from one autostereogram of the series to another, the autostereograms of the series being displayed successively instead of one another;
detecting a viewer feedback;
upon detection of the viewer feedback displaying instead of the series of autostereograms a further autostereogram of a further three dimensional scene containing a further reference surface, in which a further apparent depth of the further reference surface is selected according to the apparent depth for which the viewer feedback was received.

To view the autostereogram, the human user can make the lines of sight of his or her eyes converge in an arbitrary plane. Once an image is shown in which the convergence plane substantially coincides with the plane in which the lines of sight converge, the human user will perceive the three dimensional scene and signal this to the device. Thereupon the device keeps this image in view as a further image or shows an further image of a different scene with an apparent depth selected for a reference surface according to the depth for which the feedback was given. In this way the human viewer can easily perceive the three dimensional effects in the further autostereogram.

The variation of the apparent depth is preferably in order of increasing depth or of decreasing depth, or in a sawtooth-like sweep alternating a variation in the order of increasing apparent depth over a depth range with a variation in the order of decreasing apparent depth over that depth range. The depth for which the feedback was given may be determined for example simply by taking the apparent depth used in the image displayed when the feedback was given, or for example by using a further feedback, the apparent depth of the autostereograms being varied between the feedback and the further feedback in reverse order of the variation before the feedback.

The method according to the invention has an embodiment wherein the method comprises the following steps
measuring a position of the eyes of the viewer,
adapting the further autostereogram in correspondence with changes in the position of the eyes so as to keep the further apparent depth of the further reference plane constant as observed from the position of the eyes of the viewer. In this way the proper convergence plane can be retained even when the human viewer moves his or her head.

The method according to the invention has an embodiment compring the step of generating a stereophonic pair of sound signals simulating a source at a location at which an object of the three dimensional scene or the further three dimensional scene is rendered in the autostereogram. The sound provides the human user with an extra cue to facilitate depth perception.

BRIEF DESCRIPTION OF THE DRAWINGS

These and other advantageous aspects of the invention will be described using figures.

DETAILED DESCRIPTION OF THE PREFERRE

Figure 1:
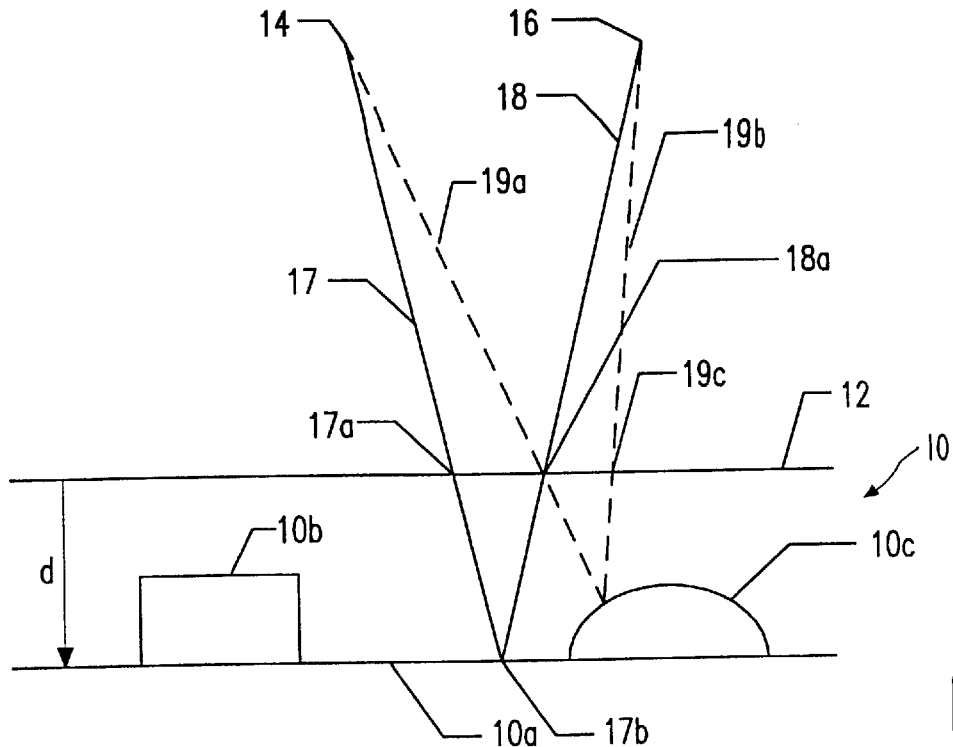
FIG. 1 shows a cross-section of a geometry involved in the use of an autostereogram

Methods of constructing autostereograms are well known per se and the skilled person should refer to the prior art for their implementation. As far as relevant for the present invention FIG. 1 shows cross-section of a geometry involved in the use of an autostereogram. The geometry contains a three dimensional scene 10 shown in cross section, a display plane 12 in side view and two eyepoints 14, 16. The three dimensional scene 10 contains a background plane 10a and two objects 10b,c, which give rise to variations in depth in a direction transversal to the display plane 12. The display plane 12 corresponds to the plane in which the autostereogram is shown to the human user. The human user views this autostereogram from the two eyepoints 14, 16 and must get the impression that he or she is viewing the three dimensional scene 10 with its variations in depth.

Perception of a scenepoint 17b in the three dimensional scene 10 involves a first and second line of sight 17, 18 to the scenepoint 17b from a first eyepoint 14 and a second eyepoint 16 respectively. The first line of sight 17 crosses the display plane 12 at a first location 17a. The second line of sight 18 crosses the display plane 12 at a second location 18a. To achieve a stereoscopic effect, the texture displayed in the autostereogram in the environment of the first and second location 17a, 18a should be made the same (the texture is a spatial distribution of light intensity and/or color). In the autostereogram this is achieved by using a basic texture pattern (which may be random) and by showing that basic pattern spatially repeated, with a repetition period equal to the distance between the first and second location. The second location 17a, which represents the crossing between the display plane 12 and the second line of sight 18 from the second eyepoint 16 to the scenepoint 17b, is also the crossing between the display plane 12 and a third line of sight 19a from the first eyepoint 14 to a further scenepoint 19d in the three dimensional scene 10. A fourth line of sight 19b from the second eyepoint 16 to the further scenepoint 19d crosses the display plane 12 at a third location 19c. In this process the background 10a and the rest of the scene 10 may be placed both in front of the display plane 12 or behind it relative to the eyepoints 14, 16.

To achieve the stereoscopic effect the texture displayed in the autostereogram in the environment of the third location 19c should be the same as that displayed in the environment of the second location 18a, and therefore also in the environment of the first location 17a. Recursively, a whole series of locations for which this holds can be obtained, therefore the basic texture pattern must be periodically repeated. A distance between the first and second location 17a, 18a depends on the depth "d" of the scenepoint 17b viewed through these locations. A further distance between the second and third location 18a, 19c depends on the depth of the further scenepoint 19d viewed through these locations. Therefore, to achieve the stereoscopic effect, the spatial period of repetition is dependent on the depth of the scenepoints. The same holds for other cross-sections (not shown) of the geometry which cross the display plane 12 displaced in a direction transversal to the line connecting the eyepoints 14, 16. As a result, the following relation holds for the intensity and/or color I(x,y) of a pixel in the display plane 12 with coordinates x,y:

$$I(x,y)=I(x-\Delta(d(x,y),x,y),y)$$

(x is the coordinate along the direction shown in FIG. 1, y is the coordinate in a direction transversal to the direction shown, d(x,y) is the depth of the scenepoint 17b in the three dimensional scene 10 viewed at the pixel with coordinates x,y from the second eyepoint 16, $\Delta(d(x,y),x,y)$ is the distance ("coordinate shift") between the two crossings 17a, 18a of the lines of sight 17, 18 to the same scenepoint 17b).

Methods of computing the autostereograms are known per se. A pixel value at a location (x,y) may be generated for example by first storing a basic pattern $I_0$ (x,y) for part of the image (preferably a strip the width of which is at least half the distance between the eyes) in image, then computing $\Delta(d(x,y),x,y)$, and fetching the previous pixel value $I(x-\Delta(d(x,y),x,y),y)$ stored in an image memory. Alternatively, one may use virtual pixel coordinates XX(x,y), computed according to $XX(x,y)=XX(x-\Delta(d(x,y),x,y),y)$ and use the X,y coordinate pair to address the basic pattern: $I(x,y)=I_0(XX,y)$.

When a human user views the autostereogram, he or she should adjust the angle between the lines of sight from corresponding points on the retina's of the two eyes, so that these lines of sight converge where the background plane 10a of the three dimensional scene 10 should be perceived, and not in the display plane 12, where they would normally converge. No three dimensional perception is possible until the proper convergence is achieved. This can make it difficult to realize three dimensional perception.

Figure 2:
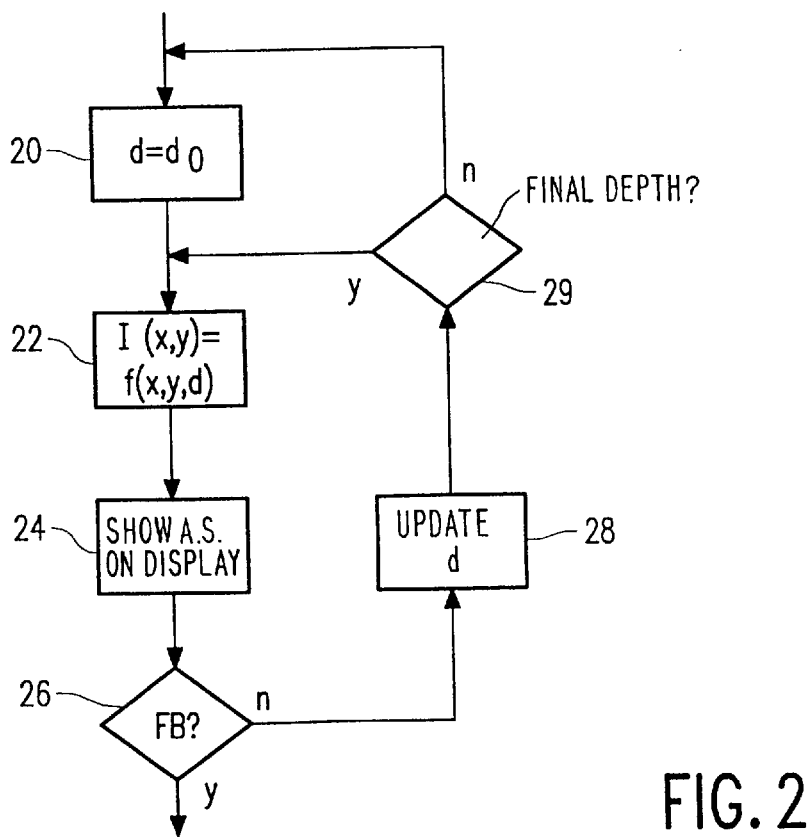
FIG. 2 shows a flow chart of a method according to the invention

FIG. 2 shows a flow-chart of a method according to the invention. This method constructs and shows a series of autostereograms, each with its own depth "d". In an initial step 20 of this flow-chart the depth "d" is set to an initial depth value d0. In a second step 22, an autostereogram is obtained of the three dimensional scene 10, in which the background plane 10a is located at a depth "d" from the display plane. In a third step 24, the computed autostereogram is shown on a display device such as a liquid crystal flat panel display or electron optic display. In a fourth step 26, it is detected whether the human viewer has given a feedback signal indicating that he or she has perceived the three dimensional effect. If so, the flowchart terminates and the last shown autostereogram remains on display. If not, the depth value "d" is updated in a fifth step 28, and it is tested in a sixth step 29 whether a final value of the depth is reached. If so, the flowchart is executed anew. If not, the second step 22 is repeated for the updated depth value "d" and in the third step 24 the newly obtained autostereogram replaces the preceding autostereogram for display (in this newly obtained stereogram the coordinate shifts A for pixels at locations representing the background 10a systematically differ from those for the preceding depth). This is repeated until the human user indicates gives a feedback signal that he or she has perceived the three dimensional effect or until the method is interrupted. Of course, the change in depth "d" could be in any direction, the steps in by which the depth is altered need not be always the same and upon reaching the end of the depth range, one may reverse the direction in which the depth is changed, instead of starting from the beginning (this avoids jumps in depth which may make it more difficult to perceive depth).

In this way the human user may converge the lines of sight from corresponding points on the retina's of the two eyes in an arbitrary reference plane and wait until an autostereogram is shown with the proper depth. If the reference plane is shown at a number of depths in front of the display plane 12, the viewer can converge the eyes at an object like his or her finger held in front of the display device on which the autostereograms are shown and wait until the apparent depth of the plane 10a coincides with that of the plane object.

Figure 3:
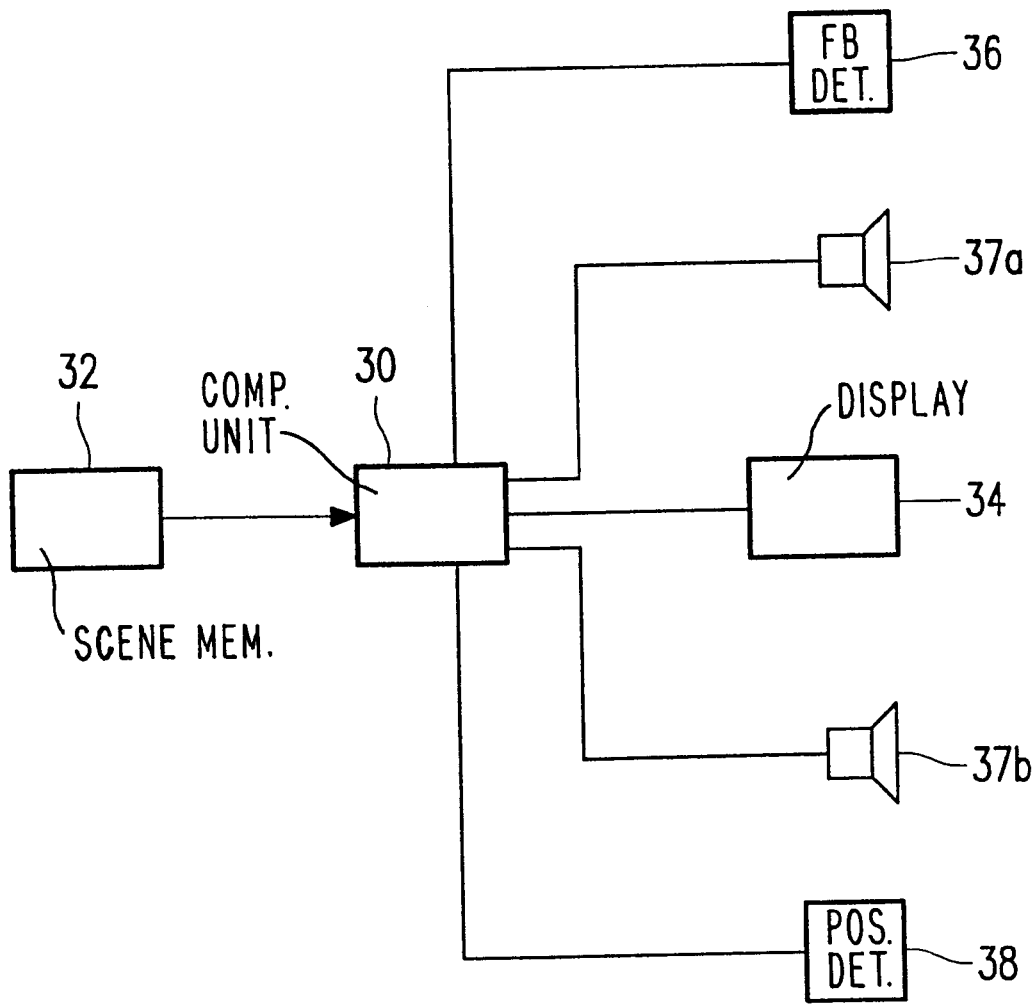
FIG. 3 shows a device according to the invention

FIG. 3 shows a device according to the invention. The device contains a computation unit 30 coupled to a scene memory 32, a display device 34, a feedback detector 36, a pair of sound reproduction devices 37a, 37b and a position sensor 38. The computation unit 30 may be for example a general purpose microprocessor, the display device 34 may be for example a liquid crystal flat panel display or an electron optics display.

In operation the device of FIG. 3 executes the steps of the flow chart of FIG. 2. The computation unit 30 fetches a model of the scene from the scene memory 30, computes the autostereogram of the scene model for the various depths "d" and after receiving instruction to start searching for the proper depth it controls the display device in order to display the autostereograms, autostereograms of successively increasing (or decreasing) depth "d" replacing each other on the display device 34. The feedback detector 36 detects a signal from the human user, for example the pushing of a button on a remote control unit, or of a key on a keyboard, and signals detection to the computation unit 30. Upon detection, the computation unit 30 stops varying the depth "d" and shows only the last displayed autostereogram. To account for delayed response by the human user, the computation unit 30 may also in response to a first detection of a feedback reverse the direction in which the depth is varied, to show the autostereograms in reverse order and slow down the speed of variation. In this case the variation of the depth is stopped only after a further feedback.

The computation unit 30 may compute all the autostereograms for various depths in advance, before they are actually shown, or it may compute the autostereograms "on the fly" as they are needed for display (the former reduces the computation requirements on the computation unit 30). Also precomputed and collectively stored autostereograms of the three dimensional scene 10 for the various depths may be used. The basic texture pattern used to generate the autostereograms may be the same for all depths, or it may be varied gradually as a function of depth, for example in order to show the objects 10b,c in color. The depth of all of the objects in the three dimensional scene 10 may be varied together for the computation of the autostereograms or the depth of only some elements of the three dimensional scene 10, for example only the background 10a may be varied (in this case only the virtual coordinate shifts $\Delta(d(x,y),x,y)$ of pixels showing background scenepoints need to be recomputed for each depth, which may be simplified by approximating this shift $\Delta(d(x,y),x,y)$ by the same shift $\Delta(d)$ for all such background points given a depth d. Alternatively, approximate autostereograms may be realized by scaling the shifts $\Delta(d(x,y),x,y)$ obtained for one autostereogram by a factor from one stereogram to another to simulate a change in apparent depth). In any case an approximate value of $\Delta(d(x,y),x,y)$ suffices in the search for the appropriate depth because only the change in apparent depth and not the accuracy of depiction of the three dimensional scene matters during this search.

Figure 4:
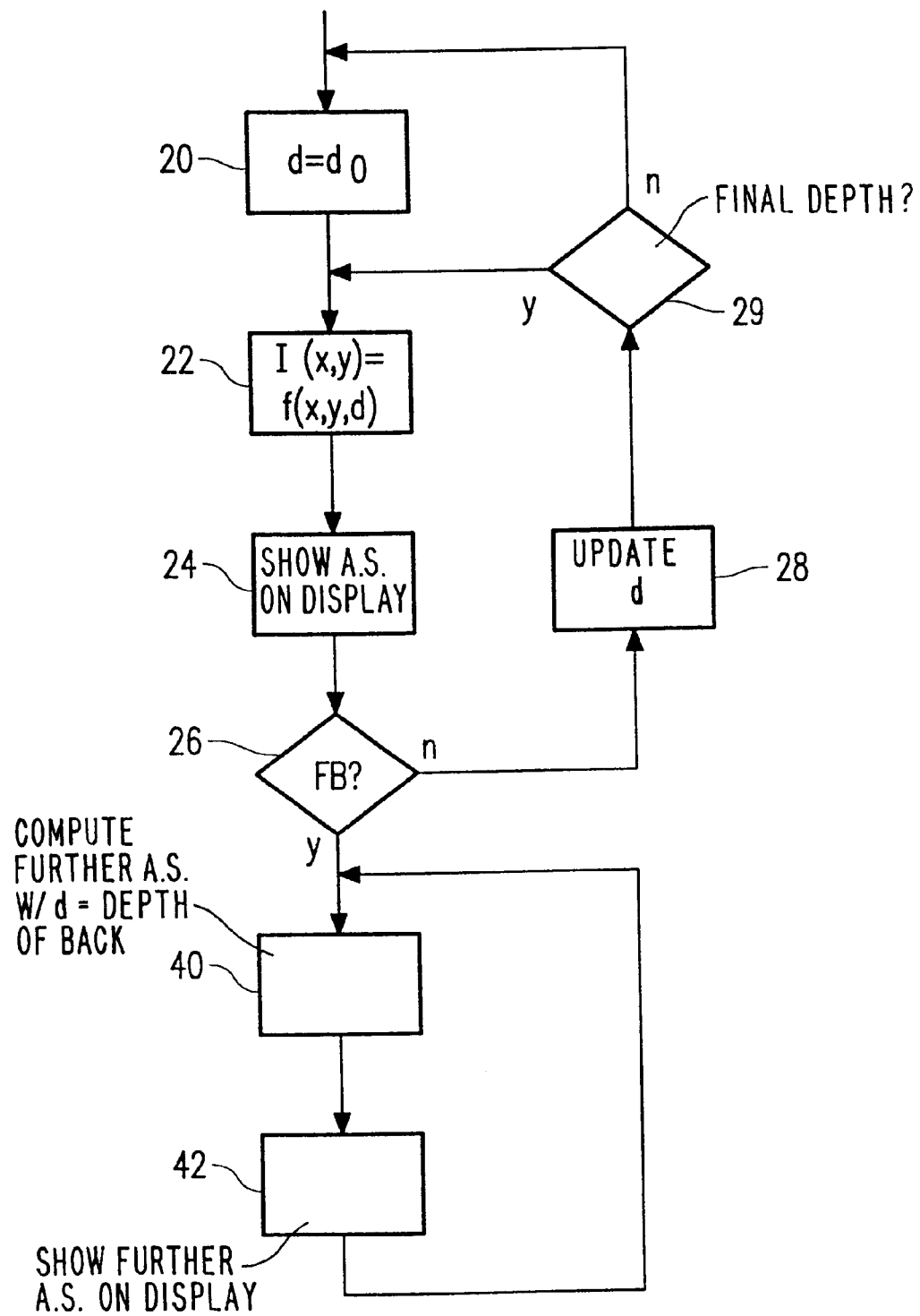
FIG. 4 shows a further flow chart of a method according to the invention.

FIG. 4 shows a further flowchart of a method according to the invention. This flowchart contains the same steps as the flowchart of FIG. 2. After detection of the user feed back the flowchart of FIG. 4 contains two additional steps 40, 42. When it detected in the fourth step 26 that the user signals that he or she perceives the three dimensional effect, a first additional step 40 is executed. In the first additional step 40 a further autostereogram is computed of a further three dimensional scene (different from the three dimensional scene used in the second and third steps 22, 24) in which the depth "d" at which some surface (preferably a background) is shown is equal to the depth "d" of the background 10a of the original three dimensional scene 10 for which the human viewer gave the feedback signal indicating that he or she perceived the three dimensional effect. In the second additional step 42, this further autostereogram is displayed instead of the last shown autostereogram of the original three dimensional scene. This process is repeated for any number of further three dimensional scenes.

In this way the steps of FIG. 4 that also occur in FIG. 2 are used as a calibration of the depth at which the human user has converged the lines of sight of his or her eyes. The further three dimensional scenes are then shown adapted to this calibration. Thus the human viewer will have no difficulty in observing three dimensional effects in different autostereograms. Preferably information is stored for each further three dimensional scene as to which the depth of which surface will be made equal to the calibrated depth. In this case the original three dimensional scene may be a standard calibration scene, for example containing only a background and one elevated plateau, so that the human viewer may know in advance what he or she has to see during the calibration stage.

The device of FIG. 3 also contains a pair of sound reproduction devices 37a,b. These sound reproduction devices 37a,b are optionally used to generate a stereophonic sound. The stereophonic sound is computed form a source sound signal, for example by the computation unit 30. A source point of the sound is designated in the three dimensional scene and respective observable sound signals are computed which would occur in the three dimensional scene at the locations at which the sound reproduction devices 37a,b are located relative to the three dimensional scene as shown on the display device 34 in the autostereogram (the distance from the source point affects propagation delay and amplitude attenuation). The observable sound signals are then sent to the sound reproduction devices 37a,b for reproduction. The sound reproduction devices 37a,b may be for example a pair of headphones or a pair of loudspeakers. Two or more sound reproduction devices 37a,b may be used. The sound reproduction provides the user with an extra cue to assist in perceiving the three dimensional scene. Sound reproduction may be used during the basic steps of the flowchart (22, 24) and/or during the additional steps 40, 42.

The device of FIG. 3 also contains a position sensor 38. This position sensor 38 is optionally used to determine changes in the position of the eyes of the human viewer. When a change in this position is detected, the computation unit 30 recomputes the autostereogram so that the three dimensional scene will be perceived from the new position of the eyes at the same depth and position relative to the display plane as from the old position of the eyes. Methods of determining the position of the eyes are known per se. One may for example use a camera to detect rapid image changes due to blinking eyes to determine their position. Adjustment of the autostereogram in response to changes in eye position are especially useful during the additional steps 40, 42 to keep the calibration obtained in the original steps 20, 22, 24, 26, 28 up to date. Adjustment due to a change in the position of the eyepoints 15, 16 results in different values for $\Delta(d(x,y),x,y)$ as can be readily determined using FIG. 1 and the definition of $\Delta(d(x,y),x,y)$. By means of the different $\Delta(d(x,y),x,y)$ the adjusted stereogram is readily computed.

What is claimed is:

1. A method for displaying autostereograms comprising:
    successively displaying a series of autostereograms of a three dimensional scene containing a reference surface, an apparent depth at which the reference surface is rendered varying from one autostereogram of the series to another;
    detecting a viewer feedback; and
    upon detection of the viewer feedback displaying instead of the series of autostereograms a further autostereogram of a further three dimensional scene containing a further reference surface, in which a further apparent depth of the further reference surface is selected according to the apparent depth for which the viewer feedback was received.

2. A method according to claim 1, wherein the autostereograms of the series are displayed in order of apparent depth.

3. A method according to claim 1, wherein a content of the three dimensional scene differs from a content of the further three dimensional scene.

4. A method according to claim 1, further comprising:
    measuring a position of the eyes of the viewer, and
    adapting the further autostereogram in correspondence with changes in the position of the eyes so as to keep the further apparent depth of the further reference plane constant as observed from the position of the eyes of the viewer.

5. A method according to claim 1, further comprising generating a stereophonic pair of sound signals simulating a source at a location at which an object of the three dimensional scene or the further three dimensional scene is rendered in the autostereogram.

6. A device for displaying autostereograms, the device comprising:

a display device, image signal generating means, for generating image signals representing a series of autostereograms of a three dimensional scene containing a reference surface, an apparent depth at which the reference surface is rendered varying from one autostereogram of the series to another, the image signal generating means being coupled to the display device, the image generating means supplying the image signals to the display device to display the autostereograms of the series successively; and a detector for detecting a viewer feedback from a human viewer, the detector being coupled to the image signal generating means, the image signal generating means generating a further image signal in response to detection of the viewer feedback, the further image signal representing a further autostereogram of a further three dimensional scene containing a further reference surface, the image generating means selecting a further apparent depth of the further reference surface according to the apparent depth for which the viewer feedback was received, the image signal generating means supplying the further image signal to the display device for display of the further autostereogram instead of the series of autostereograms.

7. A device according to claim 6, wherein a content of the three dimensional scene differs from a content of the further three dimensional scene.

8. A device according to claim 7, further comprising:

an eye position detector for detecting a position of the eyes of the human viewer;

the eye position detector being coupled to the image signal generating means, the image generating means adapting the further autostereogram in correspondence with changes in the position of the eyes so as to keep the further apparent depth of the further reference plane constant as observed from the position of the eyes of the viewer.

9. A device according to claim 6, further comprising a sound signal generator for generating a stereophonic pair of sound signals simulating a source at a location at which an object of the three dimensional scene or the further three dimensional scene is rendered in the autostereogram.

* * * * *